United States Patent
Gounon

(10) Patent No.: US 7,259,717 B2
(45) Date of Patent: Aug. 21, 2007

(54) METHOD AND DEVICE FOR DETERMINING THE RELATIVE POSITION OF TWO POINTS

(75) Inventor: René Gounon, Château Thebaud (FR)

(73) Assignee: Thales, Neuilly/Sur/Seine (FR)

( * ) Notice: Subject to any disclaimer, the term of this patent is extended or adjusted under 35 U.S.C. 154(b) by 0 days.

(21) Appl. No.: 10/534,968

(22) PCT Filed: Mar. 7, 2003

(86) PCT No.: PCT/FR03/00746

§ 371 (c)(1),
(2), (4) Date: May 16, 2005

(87) PCT Pub. No.: WO03/076962

PCT Pub. Date: Sep. 18, 2003

(65) Prior Publication Data
US 2006/0049983 A1    Mar. 9, 2006

(30) Foreign Application Priority Data
Mar. 8, 2002    (FR) ................................ 02 02959

(51) Int. Cl.
    *G01S 5/14*    (2006.01)
(52) U.S. Cl. .............................. 342/357.08; 342/357.03
(58) Field of Classification Search ........... 342/357.08, 342/357.03, 357.04
    See application file for complete search history.

(56) References Cited

U.S. PATENT DOCUMENTS 5,148,179 A * 9/1992 Allison ................ 342/357.033
5,495,257 A    2/1996 Loomis
5,577,122 A    11/1996 Schipper et al.
5,680,140 A    10/1997 Loomis
5,825,328 A    10/1998 Schipper et al.
2005/0024263 A1 * 2/2005 Sharpe et al. .......... 342/357.03

FOREIGN PATENT DOCUMENTS

EP    0 886 148    12/1998
FR    2 715 230    7/1995

OTHER PUBLICATIONS

L. Wanninger, Carrier-phase multipath calibration of GPS reference stations, Navigation, vol. 48(2), p. 113-124, Summer 2001.*
English Translation of EP 0 886 148.*

* cited by examiner

*Primary Examiner*—Thomas H. Tarcza
*Assistant Examiner*—Fred H. Mull
(74) *Attorney, Agent, or Firm*—Lowe Hauptman & Berner, LLP

(57) ABSTRACT

The invention relates to a method for determining the relative position of a mobile in relation to the known position of a reference station. The relative position calculation comprises the steps of: -a) choosing a linear combination of satellite transmission frequencies L1 and L2 from a predetermined list comprising at least two linear combinations of frequencies, -b) calculating a precise relative position Pp of the mobile in relation to the reference station on the basis of the linear combinations of pseudo-ranges corresponding to the linear combination and an estimated position Pe of the mobile in relation to the reference station, -c) choosing from the list the following linear combination, if it exists, and, in this case, reiterating step b), considering the estimated position to be said precise position Pp, -d) reiterating step c) for all the linear combinations in the list.

20 Claims, 2 Drawing Sheets

METHOD AND DEVICE FOR DETERMINING THE RELATIVE POSITION OF TWO POINTS

CROSS-REFERENCE TO RELATED APPLICATIONS

The present Application is based on International Application No. PCT/FR03/00746, filed on Mar. 7, 2003, which in turn corresponds to FR 02/02959 filed on Mar. 8, 2002, and priority is hereby claimed under 35 USC §119 based on these applications. Each of these applications are hereby incorporated by reference in their entirety into the present application.

The invention relates to the precise determination of the relative position of two points which may be several tens of kilometers apart, on the basis of satellite positioning signals.

The field of application concerns the techniques requiring knowledge in three-dimensions and with centimetric precision of the position of a mobile in relation to the known position of a reference station at a distance of several tens of kilometers. Examples include geodesy, topography, hydrography, etc.

BACKGROUND OF THE INVENTION

In order to determine the relative position of a mobile in relation to a reference station, satellite-based position-measuring means are currently used, employing, for example, radio signals transmitted by GPS (Global Positioning System) or other similar systems (GLONASS system, future GALILEO system) satellites.

In the GPS system, the signal transmitted by a satellite is coded and the time taken by the signal to reach the point to be located is used to determine the distance between this satellite and this point, preferably referred to as the pseudo-range to take account of synchronization errors between the satellite clock and the station clock. These synchronization errors are conventionally eliminated through calculation when signals are received from at least four different satellites. Determination of the distance between the point to be located and a plurality of satellites, with knowledge of the geographic coordinates of the satellites, enables calculation of the coordinates of the point to be located, most often coordinates expressed as latitude, longitude and altitude at a fixed terrestrial reference point.

In order to determine the relative position of a mobile in relation to a reference station, a method known as "differential GPS" is used, which involves locating a point in relation to a reference station and not in relation to an independent terrestrial reference point: by providing a receiver at the reference station, it is possible to determine the relative position of the mobile in relation to the reference station using measurements taken at the station and at the mobile.

The advantage of this method is that it enables to increase the positioning precision. In fact, the measurement distortions linked to the random characteristics of radio satellite signal propagation are most often strongly correlated in space, and precise knowledge of the position of the reference station allows these to be largely compensated by comparing measurements taken at the station at theoretical distances.

Propagation time is determined on the one hand with reference to a reference time of the pseudo-random code which modulates a carrier frequency transmitted by the satellite, this code reference time enabling in particular the approximate position of the mobile to be determined, i.e. accurate to within several meters to several tens of meters: the propagation time is determined on the other hand with reference to the phase of the received carrier, the phase measurement, which is less noisy than the code measurement, enabling the position of the mobile to be determined with greater precision, i.e. accurate to within centimeters, but being dependent on elimination of the ambiguity surrounding the number of phase rotations, since the phase can only be known a priori to within $2\pi$, where $2\pi$ corresponds to a distance equal to the wavelength of the radio frequency signal transmitted by the satellites.

Attention will be focused below on phase measurements only, since code position measurements can be performed in a conventional manner. The pseudo-ranges supplied by the GPS receiver of the mobile or the reference station will therefore be considered essentially as numerical phase values, a phase value being directly converted into a distance value, with knowledge of the wavelength of the radio signal transmitted by the satellites.

The central point of centimetric positioning techniques using phase measurements is the preliminary calculation, referred to as "initialization", in which the problem of ambiguities surrounding the number of wavelengths is resolved. This calculation conventionally requires prior knowledge of an estimated position of the mobile, which may be obtained in particular using a method such as that described in patents FR 2 715 230 and FR 2 764 708. This estimated position is then re-aligned with the precise position, then validated during this initialization calculation.

Particular consideration will then be given to the stage in which the estimated position is realigned towards a precise position.

The quality of this precise position depends in particular on the distance between the mobile and the reference station.

In fact, flaws in the differential method initially arise due to the fact that radio satellite signals do not encounter exactly the same propagation conditions on the satellite-station and satellite-mobile paths. The differences in the conditions encountered, which are more or less zero in the immediate vicinity of the station, naturally increase with distance.

This difference is mainly due to the ionosphere which is crossed by satellite-station and satellite-mobile signals at different points, given that the ionosphere is not a homogeneous medium. The differential measurements based on the propagation times of the satellite-station and satellite-mobile signals are therefore adversely affected by this difference. This difference may result in an error in the position of the mobile in relation to the reference station ranging from 1 to several cm per km of distance. Thus, for a distance between the station and the mobile which is greater than a distance in the order of 10 km, the position of the mobile in relation to the reference station cannot be guaranteed with centimetric precision.

A first solution described in FR 2764708 A1 proposes, on the one hand, to reduce the initialization calculation time, in particular the time for calculating an approximate unambiguous position using, in particular, linear combinations of transmission frequencies L1 and L2 of GPS system satellites. On the other hand, it proposes to reduce the ionospheric error; the reduction in the ionospheric error applies during the realignment phase. It consists in calculating, on the basis of the approximate unambiguous position, on the one hand, a position (XL1, YL1, ZL1) for L1 and, on the other hand, a position (XL2, YL2, ZL2) for L2, the precise position (X, Y, Z) then resulting from the following linear combination: X=(1.65 XL1−XL2)/0.65 Y=(1.65 YL1−YL2)/0.65 Z=(1.65 ZL1−ZL2)/0.65.

However, due to the calculation of a position on L1, adversely affected by an ionospheric error E, and the calculation of the position on L2, adversely affected by an ionospheric error 1.65*E, it is still not possible to eliminate ambiguities if the ionospheric error increases, which occurs when the distance between the mobile and the reference station increases.

A different solution conventionally proposed consists in providing not one but a plurality of reference stations, constituting what is commonly referred to as a "network". According to this technique, it is possible to know not only the errors measured at one point, as is done in the case of "differential GPS", but also their gradient of evolution in the zone. The effect of spatial decorrelations of the errors is therefore largely compensated. This solution is effective, but is of course laborious and costly to implement due to the infrastructure which it requires and the cost of the communications between the stations and the mobile. Furthermore, such an infrastructure will not exist everywhere.

A method based on exploitation of the fact that the ionospheric error is a function of frequency ($1/f^2$ in the first approximation) has also been proposed.

It is then possible to determine this error or to reduce or even eliminate it by replacing the frequency f (designated by L1 or L2 in the case of the GPS system) in the calculations with a linear combination of the carrier frequencies of the signals transmitted by the satellites, i.e. by a linear combination of L1 and L2.

The result of a linear combination of L1, L2 is a new frequency L3 to which a wavelength referred to as the apparent wavelength corresponds.

For example, in the case of the GPS system in which L1=1.57542 GHz (corresponding to a wavelength of around 19 cm) and L2=1.22760 GHz (corresponding to a wavelength of around 24 cm), the combination of frequencies referred to as "Iono-Free", 9L1−7L2 allows the ionospheric error to be almost completely eliminated. The corresponding apparent wavelength is 5 cm.

However, this method is very difficult to apply due to the great difficulty in eliminating the ambiguities surrounding such short wavelengths.

SUMMARY OF THE INVENTION

The object of the invention is therefore to propose a method and a device which enables the position of a mobile in relation to a reference station, possibly at a distance of several tens of kilometers, to be obtained with centimetric position.

To achieve this object, the invention proposes a method for determining the relative position of a mobile in relation to the known position of a reference station, each using an antenna for receiving radio signals originating from an arrangement of positioning satellites transmitting on at least two frequencies L1 and L2, this method comprising the periodic determination, for each of said frequencies, of a set of 2p pseudo-ranges, i.e. p pseudo-ranges between the mobile and the p satellites and p pseudo-ranges between the reference station and the p satellites, the supply of the pseudo-ranges to a position-calculating unit, and the calculation by this unit of a relative position of the mobile in relation to the reference station based, on the one hand, on the pseudo-ranges and, on the other hand, on an estimated position Pe of the mobile in relation to the reference station, this method being mainly characterized in that, for a given set of 4p pseudo-ranges received by the calculating unit, the calculation of the relative position comprises the following steps which consist in:

a) choosing a linear combination aL1+bL2 of said frequencies L1 and L2 from a predetermined list comprising at least two linear combinations of frequencies, b) calculating the linear combinations of pseudo-ranges corresponding to said linear combination, and, on the basis of these linear combinations of pseudo-ranges and the estimated position Pe, calculating a precise relative position Pp of the mobile in relation to the reference station, c) choosing from the list the following linear combination, if it exists, and, in this case, reiterating step b), considering the estimated position to be said precise position Pp, and using the same set of 4p pseudo-ranges to obtain an even more precise relative position, d) reiterating step c) for all the linear combinations in the list.

A plurality of calculations of the position of the mobile are thus successively carried out on the basis of the same set of measurements of the pseudo-ranges using different linear combinations of frequencies, the estimated position at the beginning of a calculation being the position calculated in the preceding step.

In the preceding technique, a single calculation was carried out and the linear combination used in this calculation was related to the positions respectively calculated for each of the frequencies L1 and L2.

An important characteristic of the invention is that the linear combinations in the list are determined in such a way that the corresponding wavelengths reduce progressively and the sensitivity to ionospheric errors also reduces progressively and more rapidly than the wavelength.

In other words, the first linear combination of frequencies is chosen so that its wavelength is long in order to facilitate the elimination of ambiguity surrounding the number of phase rotations; but, conversely, this first linear combination may correspond to a significant sensitivity to ionospheric errors. Since the estimated position Pe has been improved following this first realignment, the second linear combination in the list corresponds to a shorter wavelength and to even less ionospheric error. This process continues, using shorter and shorter wavelengths and lower and lower sensitivities to ionospheric errors.

In the context of the GPS system, the first combination may be the combination L1−L2 (a=1, b=−1); the last may be 9L1−7L2 (a=9, b=−7), a combination known to be virtually immune to ionospheric errors.

The intermediate combinations are preferably as follows (in sequence):

2L1−L2; 3L1−2L2; 4L2−3L1.

According to a different characteristic aspect of the invention, step b) of the calculation is carried out either in a single step directly using the p satellites, or in two steps, the first of which uses only a reduced number p' (p'<p) of satellites and the second uses the p satellites. It is preferably only on using the first linear combination (longest wavelength) that the calculation is made in two steps, the other linear combinations being used according to a calculation in a single step with the p satellites.

If step b) is carried out in two steps, it advantageously corresponds to the following steps, consisting in:

b1) calculating an approximate relative position Pa of the mobile in relation to the reference station on the basis of the chosen linear combination, Pe and a subset of 4p' pseudoranges corresponding to p' satellites, where p' is less than p and where the p' satellites chosen from the arrangement of p satellites are those which, taking into account the current geometry of the arrangement, are least sensitive to an error in the estimated position.

b2) calculating a precise relative position Pp of the mobile in relation to the reference station on the basis of said linear combination, Pa and the complete set of 4p pseudo-ranges.

According to a different characteristic of the invention, the 2p pseudo-ranges between the satellites and the reference station are determined by the reference station and sent by radio to the mobile which then comprises reception means for receiving these pseudo-ranges and information for dating the measurement of these pseudo-ranges.

Finally, the object of the invention is not only the method for determining the relative position of a mobile in relation to the known position of a reference station, the general outline of which has just been described, but also a device for determining the position of a mobile in relation to a reference station capable of carrying out this method. The device according to the invention comprises at least, in the mobile, means for receiving satellite positioning signals and means for receiving a set of 2p pseudo-ranges transmitted by the reference station and representing the pseudo-ranges between the reference station and p satellites for at least two different carrier frequencies L1 and L2, means for periodic determination of a set of 2p pseudo-ranges between the mobile and the p satellites, means for supplying the 4p pseudo-ranges to a position-calculating unit, means for storing a list of linear combinations of the frequencies of the positioning signal carriers, means for carrying out, on the basis of the same set of 4p pseudo-ranges, successive calculations of the relative position of the mobile in relation to the position of the reference station, each time based on a different linear combination of frequencies chosen from the list, an estimated position Pe and the set of 4p pseudo-distances, the position estimated in a calculation with a given linear combination from the list being the relative position calculated on the basis of the preceding linear combination from the list.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the invention will be explained in the detailed description which follows, provided as a non-limiting example, with reference to the attached drawings, in which.

DETAILED DESCRIPTION OF THE INVENTION

Figure 1:
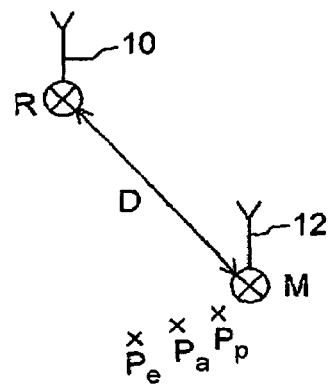
FIG. 1 schematically shows a distribution of the positions of the reference station, the mobile, and the estimated, approximate and precise positions of the mobile in relation to the position of the reference station.

FIG. 1 shows the position R of the reference station at a distance D, which may be several tens of kilometers, from a mobile whose true position is M. This figure also shows the estimated position Pe, approximate position Pa, and precise position Pp of the mobile which will be referred to later. The point Pe corresponds to the position M of the mobile estimated to within several meters (1 to 2 meters, for example), the point Pa corresponds to that of the mobile calculated with an error of one to several decimeters, the point Pp corresponds to that of the mobile calculated with a maximum error of several centimeters.

The reference station and the mobile are equipped with an antenna 10 and 12 respectively for receiving radio signals originating from positioning satellites (GPS or other system) and means for demodulating and processing the received signals. The mobile periodically calculates pseudo-ranges between its position and the position of the satellites at a given time. The station calculates pseudo-ranges in the same manner (measured at the same time, or reduced to the same measuring time) between its position on the position of the satellites. As already seen in the preamble, the pseudo-ranges are conventionally supplied in the form of a first numerical value which defines the temporal position of the pseudo-random code transmitted by a satellite at a given time, and a second numerical value which defines the phase of the radio frequency signal modulated by this code at the same time.

In simple, low-precision receivers (mobiles or reference stations), a single coded radio frequency signal is used by the receiver circuits. In more precise receivers, on which the present invention focuses, at least two signals with a different carrier frequency, L1 and L2 originating from the satellites, are processed by the receiver. The receiver therefore periodically calculates the pseudo-ranges for each of the frequencies L1 and L2.

As a result, for a position measurement at a given time based on p satellites, the position calculation will involve a set of 4p pseudo-ranges, therefore 4p phase measurements, which are respectively:

p phase measurements between the reference station and the p satellites, at the frequency L1, p phase measurements between the mobile and the p satellites, again at the frequency L1, p phase measurements between the reference station and the p satellites, at the frequency L2, and p phase measurements between the mobile and the p satellites, at the frequency L2.

The reference station is equipped with means for transmitting the numerical values which it has determined to the mobile. The mobile is equipped with means for receiving them (antenna 11 in FIG. 2), so that, for a position calculation at a given time, the mobile has not only its own measurements of pseudo-ranges, but also measurements of pseudo-ranges determined by the reference station.

Figure 2:
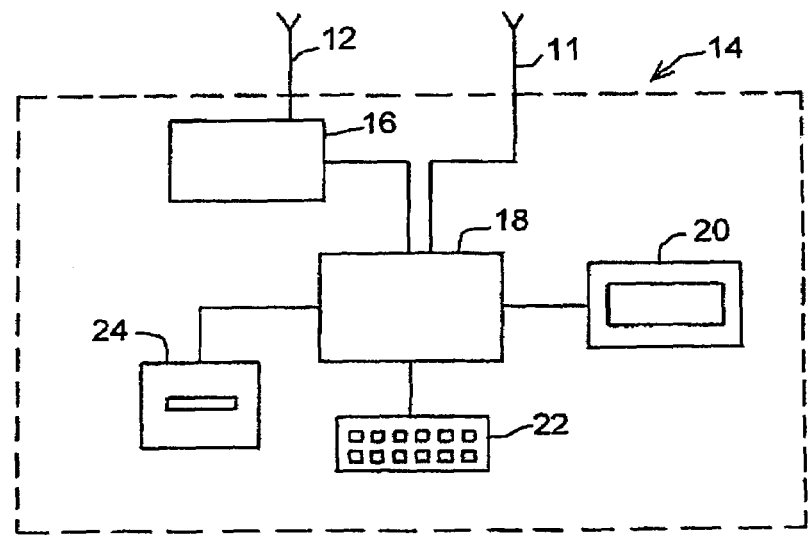
FIG. 2 schematically shows the device according to the invention.

In the mobile, the signals originating from the reference station and the signals received directly by the mobile are used by an electronic assembly 14 which the mobile comprises, as shown in FIG. 2. However, the inverse solution could be envisaged, wherein the calculations are made by the reference station, the mobile transmitting the pseudo-ranges which it has calculated to the latter. In this method, the location of the mobile is known to the station at all times, which may be useful in certain applications.

This electronic assembly 14 first comprises a satellite positioning receive circuit 16 capable of determining measurements of the pseudo-ranges between its antenna and a plurality of satellites.

The receive circuit 16 periodically (for example every 100 milliseconds) supplies a set of 2p pseudo-ranges when p satellites are in direct line-of-sight with the antenna 12. It transmits them to a relative position calculating unit 18 which furthermore receives the set of 2p pseudo-ranges corresponding to the 2p pseudo-ranges received from the same p satellites by the antenna 10 of the reference station and transmitted to the mobile by the antenna 11.

The function of the relative position calculating unit 18 is to determine the precise position Pp of the antenna 12 of the mobile in relation to the antenna 10 of the reference station.

The calculating unit 18 is programmed to carry out the required calculations and is connected to the peripheral units required according to the applications: display 20, keyboard 22, data or program reader/recorder 24, means for wired or radio transmission to a user, or simple interface to output the result of the calculations to a transmission line.

The calculating means provided in the calculating unit are suitable for carrying out the operations described below, on the basis of the set of 4p pseudo-ranges received and a given time by the mobile.

The position calculation is differential, i.e. the position of the mobile is determined in relation to the reference station (the calculation being carried out by either the mobile or the station). Therefore, the position calculation can then be considered to consist in calculating the position of the mobile on the basis of differential measurements of pseudo-ranges, producing differences between pseudo-ranges measured at the reference station and at the mobile. The calculation involves a notion of double differences of pseudo-ranges (differences between pairs of satellites) which will be described below.

Globally, using the conventional notion of double difference, the differential calculation principle is as follows:

the positions of the satellites are calculated at the measurement time t, using the ephemerides of the satellites;

the differential differences between the reference station and the mobile are determined on the basis of the differential measurements of pseudo-ranges, according to the boresight axes of the satellites. Distances are obtained which can be globally considered as the projections, along these axes, of the distance D between the mobile and the reference station; these are measured distances;

the distances along the same axes between the reference station and an estimated position Pe of the mobile are calculated for the same measurement time; these are estimated distances;

the difference between the measured distance and the estimated distance is determined according to each axis, and can be referred to as the extent of deviation or "innovation" according to this axis;

the deviations between the measured position of the mobile and the estimated position are calculated on the basis of these extents of deviation, using the director cosines representing the directions of the boresight axes of the satellites;

the calculated deviations are added to the estimated position to produce a calculated position of the mobile which is either a final position Pp or a new estimated position Pe intended for a subsequent calculation step which will be described below.

As will be explained below, the double differences considered in the present invention are obtained, not on the basis of directly measured frequencies, but on the basis of linear combinations of the pseudo-ranges measured at the frequency L1 and the pseudo-ranges measured at the frequency L2.

An essential element of the present invention resides in the fact that a plurality of calculations of the position of the mobile are carried out successively on the basis of the same set of 4p measurements of pseudo-ranges using different linear combinations of the phases corresponding to the frequencies L1 and L2. This entails a calculation of the theoretical phases of a carrier frequency which would theoretically be the linear combination of the frequencies L1 and L2. A plurality of linear combinations are successively used for the same set of 4p pseudo-ranges; the calculation uses the pseudo-ranges and an estimated position, and arrives at a position calculated for a given linear combination; the position calculated for this linear combination serves as the estimated position for a subsequent calculation using a different linear combination. The succession of linear combinations, corresponding to different apparent wavelengths, is such that the precision of the calculation increases progressively. The linear combinations of frequencies are chosen from one calculation to the next in particular in such a way that the corresponding apparent half wavelength is equal to or greater than the position error resulting from the preceding calculation, while reducing ionospheric error.

As shown below, double differences established for pairs of satellites, determined in such a way as to further increase the apparent wavelength, taking into account the geometry of the arrangement of satellites (the apparent wavelength of a pair of satellites is longer when viewed from a narrow angle), are used in the position calculations.

By judiciously combining the choice of linear combinations of frequencies and pairs of satellites, it is therefore possible to progress from an estimated position of decimetric or even metric precision to the desired position of centimetric precision. The linear combinations are chosen from a list, an example of which is given below. This list is stored, for example, in the unit 24 to be used by the calculating unit 18.

In the case of GPS, the linear combinations apply to the frequencies L1 and L2. The result of a linear combination of L1, L2 is a new frequency L3 to which a wavelength referred to as the apparent wavelength corresponds. The receive circuit 16 supplies the calculating unit 18 with the phase $\phi_{L1}$ of the signal transmitted by the satellite for L1 and the phase $\phi_{L2}$ of the signal transmitted by the satellite for L2, these two phases representing the distance between the satellite and the mobile; the calculating unit 18 will then be able to use, not the phase $\phi_{L1}$ or the phase $\phi_{L2}$, but a phase $\phi_{L3}$ corresponding to the following linear combination:

$L3 = a.L1 + b.L2$ according to the formula $\phi_{L3} = a.\phi_{L1} + b.\phi_{L2}$ Similarly, the reference station sends phases to the mobile, representing, for each satellite, the distance between the satellite and the reference station, and the same linear combination can be used to determine an apparent phase at the wavelength L3.

The numbers a and b are the coefficients of the chosen linear combination.

For each linear combination, not only the apparent wavelength (and therefore the distance beyond which the phase measurement becomes ambiguous), but also the sensitivity to ionospheric propagation errors can be calculated. If the error existing at the frequency L1 is taken as the reference ionospheric error value, the corresponding error value for each linear combination can be calculated. If, for example, the error on L1 is 1 cm/km of distance, the error on L1 for a distance of 10 km to several tens of kilometers would reach 10 cm to several tens of cm.

To correct this error, direct use of a linear combination of frequencies could be envisaged, producing very low ionospheric propagation error; the combination referred to as "Iono-Free" 9L1–7L2 has very little error; but it corresponds to a very short apparent wavelength (5 cm) so that it is impossible to eliminate its phase ambiguity on the basis of a distant estimated position.

For GPS and as a preferred example, the following ordered list of linear combinations has been drawn up with the corresponding apparent wavelength and the ionospheric error coefficient (relative to the unit reference value for the frequency L1). The apparent wavelengths are decreasing, and the ionospheric error coefficients decrease even more rapidly.

L1–L2, known to the person skilled in the art by the name of "Wide-Lane", which corresponds to an apparent wavelength of around 86 cm with an ionospheric error ratio in relation to the basic frequency L1 of 1.3;

2L1–L2, which corresponds to an apparent wavelength of around 16 cm with an ionospheric error ratio in relation to the basic frequency L1 of 0.56;

3L1–2L2, which corresponds to an apparent wavelength of around 13 cm with an ionospheric error ratio in relation to the basic frequency L1 of 0.3;

4L2–3L1, which corresponds to an apparent wavelength of around 11 cm with an ionospheric error ratio in relation to the basic frequency L1 of 0.1;

9L1–7L2 which, as already mentioned, is known as "Iono-Free", corresponding to an apparent wavelength of around 5 cm with an ionospheric error ratio in relation to the basic frequency L1 close to zero.

This sequence of linear combinations is of course only one example, adapted to GPS in its current situation: it will differ in particular in the case of frequencies L1 and L2 which differ from those specified (future developments of GPS, other radio satellite systems such as Galileo); it may also contain only some of these linear combinations and/or may incorporate others.

The principle is that, with a set of 4p pseudo-ranges combined in linear fashion, the calculation can be carried out using an estimated position and the first linear combination from the list, with a low risk of phase ambiguity due to the long wavelength of this combination; a first calculated position is obtained which is more precise than the estimated position. This calculated position serves as an estimated position for a different calculation carried out with the same 4p pseudo-ranges, but combined according to the following combination from the list, corresponding to an apparent wavelength which is shorter, but still long enough so as not to introduce phase ambiguity, taking into account the ionospheric error prevailing following the first calculation. A new, even more precise, calculated position is achieved. This more precise position serves as an estimated position for a third calculation with the same set of pseudo-ranges, combined according to the third linear combination from the list, and so on. With each step, the position is improved due to the reduction in the ionospheric error, and the improvement in this position enables the choice, in the following step, and without risk of the ambiguity error, of a shorter wavelength which, with an even greater reduction in the ionospheric error, allows the calculated position to approximate more closely the true position.

Figure 3:
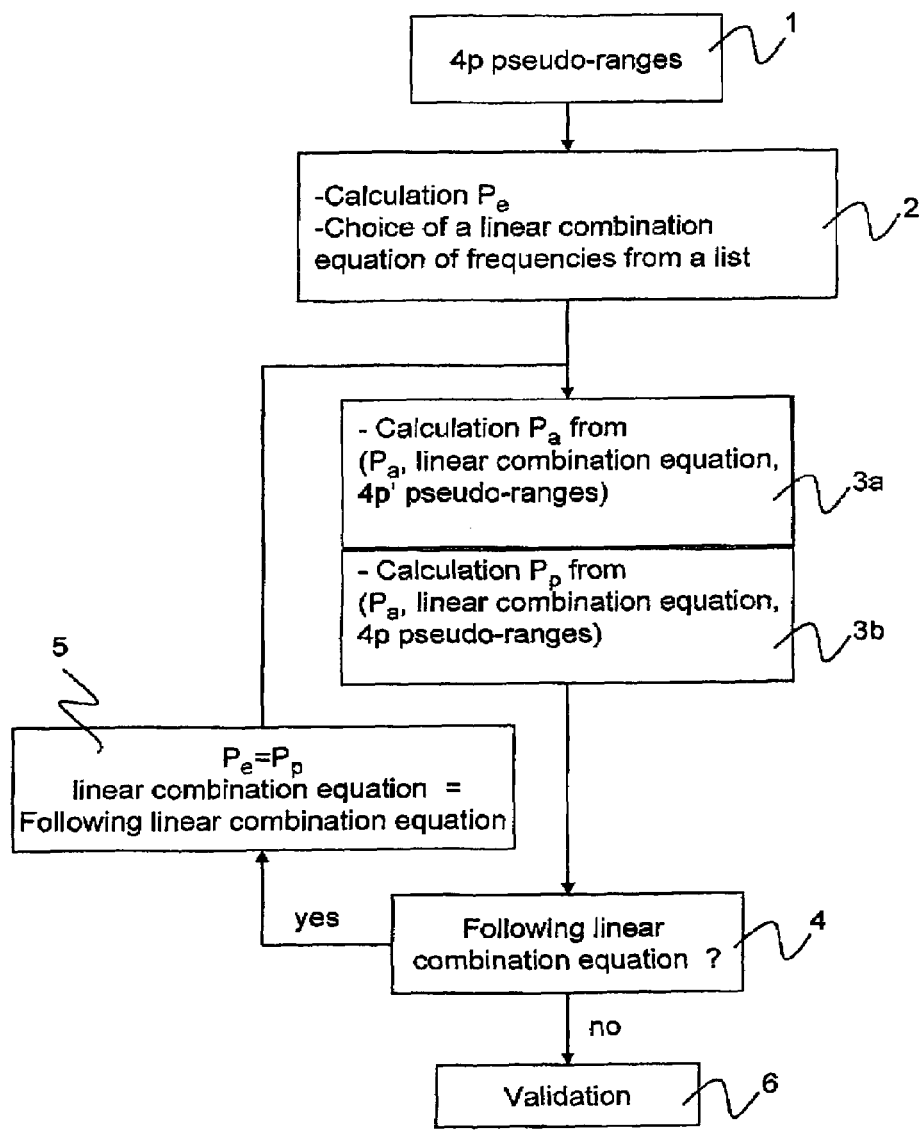
FIG. 3 shows a flow diagram of the calculations performed.

FIG. 3 schematically shows the main steps of the calculations carried out.

A set of 4p pseudo-ranges is supplied to the calculating unit (step 1) which furthermore determined an estimated position Pe and which chooses the first linear combination of frequencies from the predetermined list (step 2).

Optionally, the calculation of a position on the basis of an estimated position and a given linear combination may be carried out in two main steps:
 an approximate position Pa is calculated on the basis of the estimated position Pe of the chosen linear combination of frequencies and a set of 4p' pseudo-ranges (step 3a).
 a precise position Pp is then calculated on the basis of the approximate point Pa, the same chosen linear combination of frequencies and the complete set of 4p pseudo-ranges (step 3b).

In a variant of the invention, it is possible to calculate directly in one step the precise position Pp on the basis of the estimated position Pe, the chosen linear combination of frequencies and a complete set of 4p pseudo-ranges; the calculation may be carried out, for example, in two steps for the first linear combination, and in one step for the following linear combinations.

If all the linear combinations from the list have not yet been used (step 4), the following linear combination is chosen from the list and steps 3a and 3b are reiterated, taking the calculated position Pp resulting from step 3b as the estimated position (step 5).

If all the linear combinations from the list have been used, the position Pp resulting from the last calculation is validated (step 6) by conventionally determining the coherence value of the calculated position, to reject the solutions which do not satisfy minimum coherence criteria. At the end of this validation step, the position Pp is the position of the mobile, established with centimetric precision.

If the position Pp is not validated, the steps described are carried out on the basis of a different set of 4p pseudo-ranges.

Details will now be provided, as an example, of the calculation of steps 3a and 3b which can be carried out to obtain a precise position Pp from an estimated position Pe.

The phase in which an approximate position Pa (step 3a) is obtained uses an initial estimated position Pe; and it advantageously uses a sub-set of 4p' pseudo-ranges chosen from the set of 4p pseudo-ranges.

The position calculation is carried out by double-difference processing of the 4p' pseudo-ranges.

The processing known as "double-difference" consists in working, not directly on the basis of the differences for two satellites between pseudo-ranges, but on the basis of differences between the reference station and the mobile, of the difference for two satellites between pseudo-ranges.

These pairs of satellites are chosen according to their sensitivity to position errors, this sensitivity been dependent on the geometry between the satellites and the measurement point. Since the geometry of visibility of the p satellites at the measurement time is known thanks to the ephemerides and the estimated position, the pairs of satellites can be classified in the order of their increasing sensitivity to position errors. Only the p' satellites corresponding to the least sensitive pairs will be used, allowing the apparent wavelength to be increased. More precisely, the double differences of the following type will be calculated:

$DDij=(Dim-Djm)-(Dir-Djr)$, in which:

Dim is the pseudo-range from the mobile to the satellite in row i,

Djm is the pseudo-range from the mobile to the satellite in row j,

Dir is the pseudo-range from the reference station to the satellite in row i,

Djr is the pseudo-range from the reference station to the satellite in row j.

Differences of the Dim−Djm or Dir−Djr type allow the errors common to the satellites (clock differences between the satellites and the receiver) to be eliminated.

The differences between these differences, or double differences DDij, allow the errors due to atmospheric or ionospheric propagation to be eliminated.

The double differences are calculated on the one hand for the frequency L1 (difference DDij1) and, on the other hand for the frequency L2 (difference DDij2). A linear combination of double differences CLij=aDDij1+bDDij2 is then calculated for a first linear combination of frequencies L3=aL1+bL2. These are the linear combinations which will be used, rather than the conventional double differences, for the position calculation; they represent a phase at the apparent wavelength of the fictitious frequency L3 and are expressed here as distances.

The combinations of double differences CLij are compared to similar combinations, calculated and not measured, on the basis of the initial estimated position Pe. The difference resulting from this comparison is referred to as INNOVij, representing the deviation between the estimation and the measurement.

These deviations are linked to the deviations of longitude, latitude and altitude DL, DG and DA between the estimated position (here the initial position Pe) and the calculated position (here the approximate calculated position Pa) by equations of the type $INNOVij=DL[\cos(Evi)\cos(Azi)-\cos(Evj)\cos(Azj)]$ $+DG[\cos(Evi)\sin(Azi)-\cos(Evj)\sin(Azj)]$ $+DA[\sin(Evi)-\sin(Evj)]$ where Evi, Evj are the elevations of the satellites i and j, and Azi, Azj are their azimuths.

A simple calculation, or matrix calculation with minimization of errors using the least squares technique if there are more than 4 satellites, allows DL, DG, DA to be determined, representing deviations between the measured position and the estimated position. These deviations are added to the longitude, latitude, and altitude of the estimated position Pe to obtain an approximate position Pa.

A second calculation step (step 3b) is carried out on the basis of this approximate position Pa. The second step is very similar to the first, but it uses all the 4p pseudo-ranges, i.e. those corresponding to all the satellite pairs, it uses the approximate position Pa rather than the initial estimated position Pe as the estimated position, it uses a matrix calculation with a number of equations which is generally higher than the number of unknowns (the number p of satellites being assumed to be greater than 4) for calculating a precise position Pp; the deviations DL, DG, DA between the estimated position and the calculated position can then be conventionally determined using a least squares method (the position determined by calculation is the position which minimizes the mean square value of the residues).

The position Pp is then used in a new calculation as the estimated position, instead of the position Pe, using the following linear combination from the list.

Progressively, by iteration through to the end of the list, an increasingly precise and unambiguous value of the position of the mobile is obtained.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of determining the relative position of a mobile in relation to the known position of a reference station, each using an antenna for receiving radio signals originating from an arrangement of positioning satellites transmitting on at least two frequencies L1 and L2, this method comprising the steps of:

periodically determining, for each of said frequencies, of a set of 2p pseudo-ranges, for p pseudo-ranges between the mobile and the p satellites and p pseudo-ranges between the reference station and the p satellites, supplying of the pseudo-ranges to a position-calculating unit, and calculating by the position-calculating unit of a relative position of the mobile in relation to the reference station based on the pseudo-ranges and on an estimated position Pe of the mobile in relation to the reference station, and, for a given set of 4p pseudo-ranges received by the position-calculating unit, calculating the relative position, comprising the following steps:

a) choosing a linear combination equation aL1+bL2 of said frequencies L1 and L2 from a predetermined list having at least two linear combination equations of frequencies, b) calculating linear combinations of pseudo-ranges corresponding to the chosen linear combination equation, and, on the basis of these linear combinations of pseudo-ranges and the estimated position Pe, calculating a precise relative position Pp of the mobile in relation to the reference station, c) choosing from the list the following linear combination equation, setting the estimated position Pe to be a new estimated position Pe equal to said precise position Pp, and reiterating steps b) by calculating new linear combination equation using the same set of 4p pseudo-ranges and, on the basis of the new linear combination of pseudo-ranges and the new estimated position Pe, obtaining an even more precise relative position, d) reiterating step c) for all the remaining linear combination equations in the list.

2. The method according to claim 1, wherein the linear combination equations in the list are determined in such a way that, from one calculation to the next, the corresponding wavelengths reduce progressively and the sensitivity to ionospheric errors also reduces progressively.

3. The method according to claim 2, wherein the first combination equation in the list is the combination equation L1−L2 (a=1, b=−1) and/or the last linear combination equation in the list is the combination equation 9L1−7L2 (a=9, b=−7), L1 and L2 being the transmission frequencies of the satellites of the GPS system.

4. The method according to claim 2, wherein the intermediate combination equations are as follows: 2L1−L2 (a=2, b=−1); 3L1−2L2 (a=3, b=−2); 4L2−3L1 (a=4, b=3).

5. The method according to preceding claim 2, wherein step b) comprises the following two steps: b1) calculating an approximate relative position Pa of the mobile in relation to the reference station on the basis of the chosen linear combination equation, Pe and a subset of 4p' pseudo-ranges corresponding to p' satellites, where p' is less than p and where the p' satellites chosen from the arrangement of p satellites are those which, taking into account the current geometry of the arrangement, are least sensitive to an error in the estimated position, b2) calculating a precise relative position Pp of the mobile in relation to the reference station on the basis of said linear combination of Pa and the complete set of 4p pseudo-ranges.

6. The method according to claim 2, wherein the steps b1) and b2) are only carried out for the first linear combination equation in the list, a single step involving the 4p pseudo-ranges being carried out for the other linear combination equations in the list.

7. The method according to claim 2, wherein the 2p pseudo-ranges between the satellites and the reference station are determined by the reference station and sent by radio to the mobile which then comprises reception means to receive these pseudo-ranges and information for dating the measurement of these pseudo-ranges.

8. The method according to claim 1, wherein the first combination equation in the list is the combination equation L1−L2 (a=1, b=−1) and/or the last linear combination equation in the list is the combination equation 9L1−7L2 (a=9, b=−7), L1 and L2 being the transmission frequencies of the satellites of the GPS system.

9. The method according to claim 8, wherein the intermediate combination equations are as follows: 2L1−L2 (a=2, b=−1); 3L1−2L2 (a=3, b=−2); 4L2−3L1 (a=4, b=−3).

10. The method according to preceding claim 8, wherein step b) comprises the following two steps: b1) calculating an approximate relative position Pa of the mobile in relation to the reference station on the basis of the chosen linear combination equation, Pe and a subset of 4p' pseudo-ranges corresponding to p' satellites, where p' is less than p and where the p' satellites chosen from the arrangement of p satellites are those which, taking into account the current geometry of the arrangement, are least sensitive to an error in the estimated position, b2) calculating a precise relative position Pp of the mobile in relation to the reference station on the basis of said linear combination of Pa and the complete set of 4p pseudo-ranges.

11. The method according to claim 8, wherein the steps b1) and b2) are only carried out for the first linear combination equation in the list, a single step involving the 4p pseudo-ranges being carried out for the other linear combination equations in the list.

12. The method according to claim 8, wherein the 2p pseudo-ranges between the satellites and the reference station are determined by the reference station and sent by radio to the mobile which then comprises reception means to receive these pseudo-ranges and information for dating the measurement of these pseudo-ranges.

13. The method according to claim 1, wherein the intermediate combination equations are as follows: 2L1−L2 (a=2, b=−1); 3L1−2L2 (a=3, b=−2); 4L2−3L1 (a=4, b=−3).

14. The method according to preceding claim 13, wherein step b) comprises the following two steps: b1) calculating an approximate relative position Pa of the mobile in relation to the reference station on the basis of the chosen linear combination equation, Pe and a subset of 4p' pseudo-ranges corresponding to p' satellites, where p' is less than p and where the p' satellites chosen from the arrangement of p satellites are those which, taking into account the current geometry of the arrangement, are least sensitive to an error in the estimated position, b2) calculating a precise relative position Pp of the mobile in relation to the reference station on the basis of said linear combination of Pa and the complete set of 4p pseudo-ranges.

15. The method according to claim 13, wherein the steps b1) and b2) are only carried out for the first linear combination equation in the list, a single step involving the 4p pseudo-ranges being carried out for the other linear combination equations in the list.

16. The method according to preceding claim 1, wherein step b) comprises the following two steps:
  b1) calculating an approximate relative position Pa of the mobile in relation to the reference station on the basis of the chosen linear combination equation, Pe and a subset of 4p' pseudo-ranges corresponding to p' satellites, where p' is less than p and where the p' satellites chosen from the arrangement of p satellites are those which, taking into account the current geometry of the arrangement, are least sensitive to an error in the estimated position,
  b2) calculating a precise relative position Pp of the mobile in relation to the reference station on the basis of said linear combination of Pa and the complete set of 4p pseudo-ranges.

17. The method according to claim 16, wherein the steps b1) and b2) are only carried out for the first linear combination equation in the list, a single step involving the 4p pseudo-ranges being carried out for the other linear combination equations in the list.

18. The method according to claim 1, wherein the steps b1) and b2) are only carried out for the first linear combination equations in the list, a single step involving the 4p pseudo-ranges being carried out for the other linear combination equations in the list.

19. The method according to claim 1, wherein the 2p pseudo-ranges between the satellites and the reference station are determined by the reference station and sent by radio to the mobile which then comprises reception means to receive these pseudo-ranges and information for dating the measurement of these pseudo-ranges.

20. A device for determining the position of a mobile in relation to a reference station, comprising:
  means for receiving satellite positioning signals;
  means for receiving a set of 2p pseudo-ranges transmitted by the reference station and representing the pseudo-ranges between the reference station and p satellites for two different carrier frequencies L1 and L2,
  means for periodic determination of a set of 2p pseudo-ranges between the mobile and the p satellites,
  means for supplying the 4p pseudo-ranges to a position-calculating unit,
  means for storing a list of linear combination equations of the frequencies of the positioning signal carriers, and
  means for carrying out, on the basis of the same set of 4p pseudo-ranges, successive calculations of the relative position of the mobile in relation to the position of the reference station, each time based on a different linear combination equation of frequencies chosen from the list, an estimated position Pe and the set of 4p pseudoranges, and when the chosen linear combination equation is different from the first linear combination equation in the list, the estimated position Pe being set as the relative position calculated in the preceding successive calculation on the basis of the preceding linear combination equation from the list.

* * * * *